United States Patent [19]

Jalan

[11] Patent Number: 5,079,107

[45] Date of Patent: Jan. 7, 1992

[54] CATHODE ALLOY ELECTROCATALYSTS

[75] Inventor: Vinod M. Jalan, Concord, Mass.

[73] Assignee: Giner, Inc., Waltham, Mass.

[21] Appl. No.: 780,587

[22] Filed: Sep. 26, 1985

Related U.S. Application Data

[63] Continuation of Ser. No. 618,418, Jun. 7, 1984, abandoned.

[51] Int. Cl.$^5$ .......................... H01M 4/92; B01J 23/00
[52] U.S. Cl. ........................................ 429/40; 429/44; 502/325; 502/326
[58] Field of Search ............................ 429/40, 44, 46; 420/466, 468; 252/182.1, 502, 503, 514; 502/325, 326

[56] References Cited

U.S. PATENT DOCUMENTS

| | | | |
|---|---|---|---|
| 3,291,753 | 12/1966 | Thompson | 429/40 X |
| 3,475,224 | 10/1969 | Adlhart et al. | 429/40 X |
| 3,689,254 | 9/1972 | Inoue et al. | 420/466 X |
| 3,961,946 | 6/1976 | Makino et al. | 420/468 |
| 4,127,468 | 11/1978 | Olfenaar | 429/40 X |
| 4,186,110 | 1/1980 | Jalan et al. | 429/40 X |
| 4,192,907 | 3/1980 | Jalan et al. | 429/40 |
| 4,316,944 | 2/1982 | Landsman et al. | 429/40 X |

Primary Examiner—Stephen Kalafut
Attorney, Agent, or Firm—A. W. Breiner

[57] ABSTRACT

Ternary alloy electrocatalysts comprising platinum and at least two less noble elements are described. The ternary alloy electrocatalysts when employed in the cathode of a fuel cell utilizing a phosphoric acid electrolyte provide improved oxygen activity and stability in comparison to unalloyed platinum. The cost of the electrocatalysts is also reduced in comparison to an unalloyed platinum electrocatalyst.

9 Claims, No Drawings

CATHODE ALLOY ELECTROCATALYSTS

This is a continuation of application Ser. No. 06/618,418 filed June 7, 1984 now abandoned.

FIELD OF INVENTION

The present invention is directed to improved catalysts particularly useful in the cathode of phosphoric acid electrolyte fuel cells. More particularly, the invention relates to electrocatalysts for fuel cells which are ternary alloys of platinum having improved activity and/or stability in hot, concentrated phosphoric acid.

BACKGROUND OF THE INVENTION

A fuel cell is a device which converts the energy of a chemical reaction between a fuel and oxidant directly into low-voltage, direct current electricity. In order to have an efficient fuel cell it is necessary that the reactions of the fuel and oxidant occur in such manner that the amount of energy degraded into heat is as small as possible. It is also necessary that the reaction rate of the cell be high enough to produce economically sufficient current from a cell of practical size. It has been found that the presently most efficient and commercially viable fuel cells are those utilizing a phosphoric acid electrolyte which are operated at temperatures in the range of from about 200° C. As a result, substantial effort has been expended in providing electrocatalysts for use in either the anode or cathode of the phosphoric acid electrolyte fuel cell in order to accelerate the reactions occurring at the electrodes of the cell. Efforts have also been made to reduce the amount of noble metal catalyst, i.e., platinum, loading in the electrodes of a fuel cell. Additional improvements in phosphoric acid fuel cell performance have been achieved by reducing iR and diffusion losses in the cell. Thus, in the time frame of 1965 to 1976 the noble metal catalyst loadings in a fuel cell cathode was reduced from about 20 mg/cm$^2$ to 0.75 mg/cm$^2$ of active cell area. During the same period of 1965 to 1976 substantial improvements have resulted from technological or engineering improvements, not specifically related to electrocatalysts. In the time period of 1976 to the present substantial improvements in the activity and stability of the fuel cell cathode have been demonstrated by using highly dispersed platinum alloys as described, for example, by Jalan in U.S. Pat. Nos. 4,186,110; 4,192,907; and 4,137,373. According to those patents it has been determined that binary alloys such as platinum-vanadium were five times more active than platinum on a specific activity basis. Additionally, increased activity and stability have been demonstrated in platinum-carbon electrocatalysts. In order to provide greater viability in a commercial fuel cell, it is necessary to provide a greater improvement in the activity, stability, and cost of electrocatalysts so as to provide a fuel cell where the cost per rated power is reduced.

OBJECTS OF THE INVENTION

Accordingly, it is an object of the present invention to provide electrocatalysts particularly useful in the cathode of a phosphoric acid electrolyte fuel cell which have greater activity and/or stability than previously known catalysts.

It is another object of this invention to provide electrocatalysts which are less expensive than previously known catalysts while having activity comparable to or greater than the known electrocatalysts.

It is a further object of this invention to provide an electrocatalyst which permits the use of a lower catalyst loading for equal activity.

These and other objects of the present invention will be apparent from the following description.

SUMMARY OF THE INVENTION

The objects of the present invention are accomplished by providing ternary alloy electrocatalysts containing platinum (Pt) and at least two non-noble metals or non-metals including chromium (Cr), cobalt (Co), nickel (Ni), cerium (Ce), carbon (C), phosphorous (P), arsenic (As), and boron (B). Particularly effective ternary electrocatalysts are alloys of Pt-Cr-C; Pt-Cr-Ce, and Pt-Co-Ni. These ternary alloy electrocatalysts when utilized in the cathode of a phosphoric acid electrolyte fuel cell, demonstrate greater oxygen activity and greater stability in comparison to unalloyed platinum. Thus, it has been found that these ternary alloy electrocatalysts when used in a phosphoric acid electrolyte fuel cell at the same catalyst loading supported on Vulcan XC-72, a carbon black, and operated under the same conditions provide a performance improvement of at least about 25 mV at 200 mA/cm$^2$ relative to a standard platinum/Vulcan XC-72 electrocatalyst. Vulcan XC-72 is a known carbon black commonly employed as a carrier for a catalyst in a fuel cell. Vulcan XC-72 is marketed by the Cabot Corporation, Boston, Mass. Not only is the activity and stability of the electrocatalyst improved, but the cost of the electrocatalyst in comparison to unalloyed platinum is substantially reduced.

The reason for the improved activity of the ternary alloy electrocatalysts is not fully understood. It is theorized, however, that the improved activity and stability is a result of low lattice parameters of the alloy, when the non-noble elements are alloyed with platinum to form a multimetallic alloy wherein the distance of the platinum-platinum atoms in the alloy is lower than the nearest neighbor distance in an unalloyed platinum electrocatalyst. In any event, it has been found that the ternary alloys provide an unexpected increase in activity to oxygen and stability to hot, concentrated phosphoric acid than unalloyed platinum, and also over binary platinum alloys such as platinum-chromium alloys reported to have high oxygen activity and good stability in concentrated phosphoric acid electrolyte.

PRESENTLY PREFERRED EMBODIMENTS AND DETAILED DESCRIPTION

EXAMPLE 1

Preparation Of Supported Pt-Ni-Co Ternary Alloy Catalyst

A solution is prepared from 2.91 gm of Ni(NO$_3$)$_2$.6H$_2$O; 2.91 gm Co(NO$_3$)$_2$.6H$_2$O, and 1.68 gm of crystalline urea in 3000 ml distilled water. 39 gm of 10% platinum on carbon (3.9 gm Pt=0.02 moles) is added and ultrasonically blended for fifteen minutes. The solution is placed in a 3000 ml flask equipped with stirrer, condenser thermometer, and a pH probe. The solution is then heated to boiling until it reaches a pH of 6.5. The resultant slurry is filtered. The solids are washed three times using 1.0 liter of water. The washed solids are sieved through a 100 mesh nickel screen and treated at 900° C. to provide the ternary electrocatalysts. The electrocatalyst obtained is then fabricated into a Teflon-bonded electrode using conventional techniques.

EXAMPLE 2

Preparation Of Supported Pt-Cr-Ce Ternary Alloy Catalyst

An oxide of chromium is precipitated onto platinum supported on a carbon black, and the carbon black then heated to 900° C. under inert or reducing atmosphere to provide alloying. After cooling a salt of cerium is precipitated onto the binary alloy of platinum-chromium and again heated to 900° C. under inert or reducing atmosphere to provide the ternary alloy of Pt-Cr-Ce. The supported electrocatalyst obtained was then fabricated into a Teflon-bonded electrode using conventional techniques.

EXAMPLE 3

Preparation Of Supported Pt-Cr-C Ternary Alloy Catalyst

A supported Pt-Cr binary electrocatalyst supported on carbon black was prepared as in Example 2 above. Thereafter, the ternary alloy catalyst of Pt-Cr-C was prepared by heat treating the Pt-Cr catalyst under flowing carbon monoxide at 350° C., followed by heat treatment at 900° C. in flowing nitrogen. The resultant catalysts were characterized by x-ray diffraction for alloying and by electron microscopy for particle size. The electrocatalyst was fabricated into a Teflon-bonded gas diffusion electrode.

The activity and stability of the electrodes prepared in Examples 1-3 were evaluated as the cathode in a hot, concentrated phosphoric acid electrolyte fuel cell. The fuel cell was run on hydrogen as the fuel using a standard platinum/Vulcan XC-72 carrier anode and air. The complete fuel cell performance of the fuel cells, using a standard platinum/Vulcan XC-72 carrier as a comparison is set forth in Table I.

TABLE I

| Catalyst | Comparison Of Ternary Alloys And Unalloyed Platinum In A Fuel Cell | | | | | |
|---|---|---|---|---|---|---|
| | Surface Area $m^2$/gm Pt | XRD n.n.d. Å | Build No. | Activity On $O_2$ at 900 mV mA/mg | 200 mA/$cm^2$ On $O_2$ mV | Performance On Air mV |
| Pt-standard | 143 | 2.770 | 25 | 12 | 749 | 689 |
| Pt—Cr—C | 75 | 2.731 | 24 | 33 | 785 | 725 |
| Pt—Cr—Ce | 62 | 2.737 | 23 | 29 | 777 | 719 |
| Pt—Co—Ni | 58 | 2.715 | 29 | 40 | 805 | 740 |

In accordance with the present invention the ternary alloy electrocatalysts can be utilized in a fuel cell in any conventional techniques, including as a finely divided dispersion on a carbon carrier as described in the preferred embodiments. It has also been found that while the electrocatalysts are particularly suited for use in the cathode of a phosphoric acid electrolyte fuel cell, the electrocatalyst can be used advantageously in other systems where an electrochemical reaction occurs such as in an electrolytic cell. Further, the ratio of platinum to the two non-noble elements can vary over a substantial range. It has been found, however, that preferably the platinum will comprise from about 50 to 99% of the electrocatalyst ternary alloy, with the non-noble element comprising from about 1 to 50%. Optimum performance characteristics have been obtained where the platinum is present in an amount of from 60 to 80%, and the less noble elements are present in an amount of from 20 to 40%.

As will be apparent to one skilled in the art, various modifications can be made within the scope of the aforesaid description. Such modifications being within the ability of one skilled in the art form a part of the present invention and are embraced by the appended claims.

It is claimed:

1. A fuel cell including phosphoric acid electrolyte and a cathode electrode, said electrode comprising an electrically conductive support and an electrocatalyst disposed on said support, said electrocatalyst comprising a ternary alloy which is a member of the group consisting of Pt-Ni-Co; Pt-Cr-C, and Pt-Cr-Ce, said alloy having a catalytic activity for the reduction of oxygen at least about 25 mV at 200 mA/$cm^2$ current density higher relative to an unalloyed platinum electrocatalyst under the same conditions.

2. The fuel cell according to claim 1 wherein said substrate includes a carbon carrier.

3. The fuel cell according to claim 1 wherein the ternary alloy of platinum is an alloy of Pt-Cr-C.

4. The fuel cell according to claim 1 wherein the ternary alloy of platinum is an alloy of Pt-Cr-Ce.

5. The fuel cell according to claim 1 wherein the ternary alloy of platinum is an alloy of Pt-Co-Ni.

6. An electrocatalyst for the reduction of oxygen comprising a ternary alloy disperses on a support, said alloy being a member of the group consisting of Pt-Ni-Co; Pt-Cr-C, and Pt-Cr-Ce, and said alloy dispersed on said support having a catalytic activity for the reduction of oxygen at least about 25 mV at 200 mA/$cm^2$ current density higher relative to an unalloyed platinum electrocatalyst under the same conditions.

7. The elctrocatlyst according to claim 6 wherein the ternary alloy of platinum is an alloy of Pt-Cr-C.

8. The electrocatalyst according to claim 6 wherein the ternary alloy of platinum is an alloy of Pt-Cr-Ce.

9. The electrocatalyst according to claim 6 wherein the ternary alloy of platinum is an alloy of Pt-Co-Ni.

* * * * *